Feb. 7, 1933.　　　F. W. GODSEY, JR　　　1,896,169
VEHICLE DRIVING APPARATUS AND SYSTEM
Filed Aug. 19, 1929
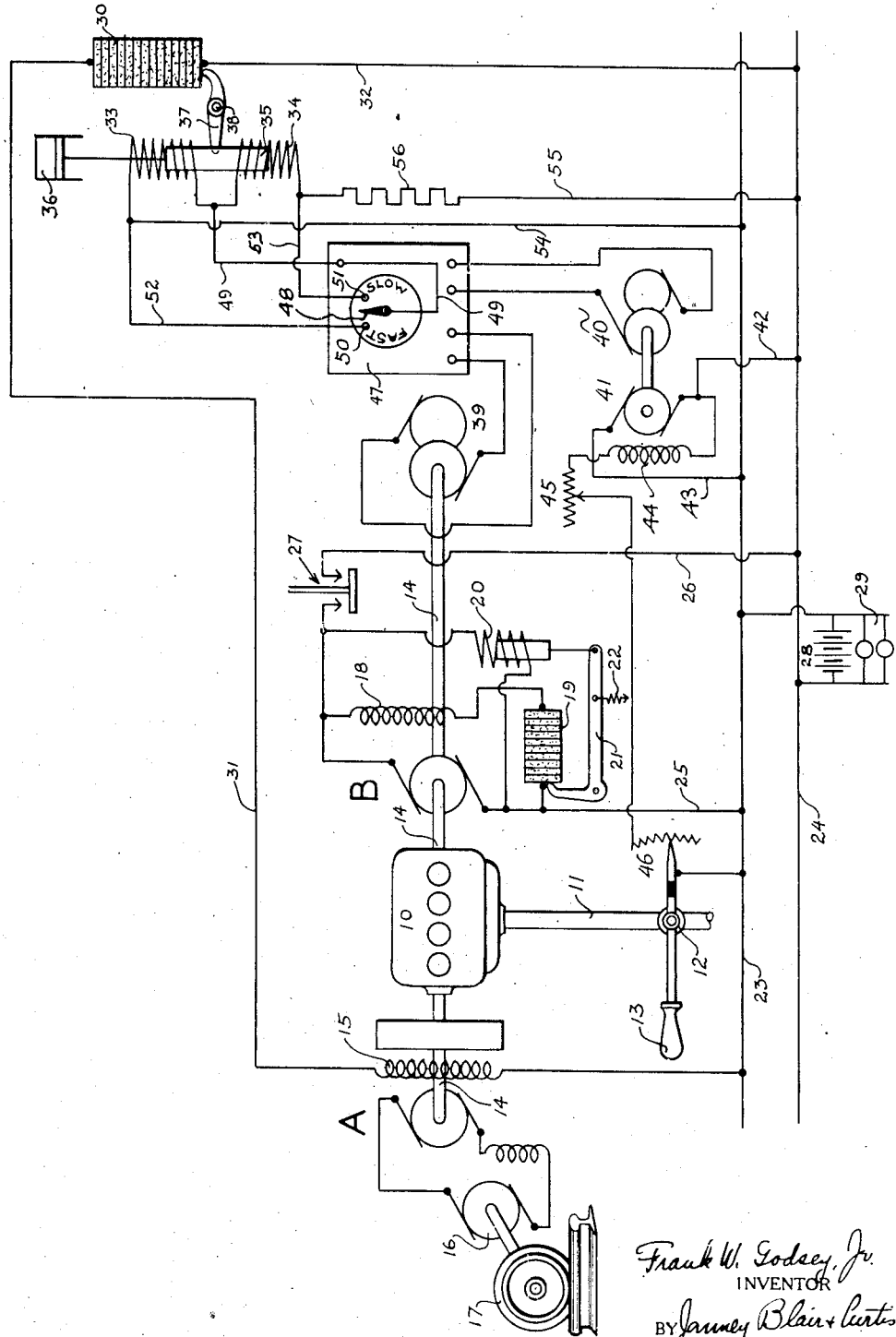
Frank W. Godsey, Jr.
INVENTOR
BY Janney Blair & Curtis
ATTORNEY Patented Feb. 7, 1933

1,896,169

UNITED STATES PATENT OFFICE

FRANK W. GODSEY, JR., OF NEW HAVEN, CONNECTICUT, ASSIGNOR TO THE SAFETY CAR HEATING & LIGHTING COMPANY, A CORPORATION OF NEW JERSEY

VEHICLE DRIVING APPARATUS AND SYSTEM

Application filed August 19, 1929. Serial No. 387,049.

This invention relates to power transmission, and more particularly to the transmission of power from a prime mover to the driving wheels or axle of a vehicle, such as a locomotive, for example.

One of the objects of this invention is to provide a thoroughly practical and efficient system and apparatus for the transmission of power and to provide a simple, dependable and thoroughly practical apparatus for controlling such a power transmission apparatus and, more particularly, for controlling the speed of certain elements thereof. Another object is to provide a thoroughly practical system of regulation of a power transmission of the above-mentioned character and, moreover, to provide a regulating system that will be fully automatic in its action in coping with certain inherent variable conditions of practical use. Another object is to provide a power transmission that will be flexible and readily and dependably adjusted to meet various different conditions in practical use. Another object is to provide a practical and thoroughly dependable speed control for power-supplying machinery. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing there is shown diagrammatically one of various possible embodiments of my invention.

Referring now to the drawing, there is shown at 10 a source of motive power preferably in the form of a gas or oil internal combustion engine supplied with fuel through the conduit 11 which leads to any appropriate source. A throttle valve 12 operable by means of a handle 13 controls the supply of fuel to the engine 10.

The engine 10 drives a shaft 14 from which is driven a generator A, the field winding 15 of which is energized in a manner more clearly described hereinafter. The generator A supplies energy to a load which illustratively is shown in the form of an electric motor 16, preferably of the series type, connected in any suitable manner to the driving wheel 17 of the vehicle. The shaft 14 also drives a generator B, the excitation of which through the field winding 18 is controlled by a variable resistance preferably in the form of a carbon pile 19, the pressure upon which is controlled by a coil 20, connected across the generator B so as to be responsive to the voltage of the latter, and acting through the bell crank lever 21 and in opposition to the spring 22 to vary the pressure upon and hence the resistance of the carbon pile 19. Thus, even if the speed of the generator B varies, the regulating apparatus 19—20 maintains the voltage of the generator B substantially constant.

The generator B supplies energy to a train line 23—24 to which it is connected by conductors 25—26, respectively, but preferably through an automatic switch 27 adapted to close the circuit upon the generator B, after starting of the engine 10, achieving an appropriate voltage and adapted to disconnect the generator B should its speed reduce below a certain value.

From the train line 23—24 various auxiliary devices may be operated. Also, a storage battery 28 is connected across the train line 23—24 and is maintained in a substantially charged condition by the generator B. As illustrative of other devices that may be operated from the train line 23—24, I have shown lamps 29.

The field winding 15 of the generator A is energized preferably by the generator B and hence is conveniently connected across the train line 23—24, but preferably through a variable resistance preferably taking the form of a carbon pile 30. The circuit of the field winding 15 will thus be seen to extend from train line conductor 23 through the field winding 15, conductor 31, carbon pile 30, conductor 32, and thence to the other train line conductor 24.

The resistance 30 is variable and the pressure thereon is controlled preferably by two coils 33 and 34 spaced axially from each other and acting upon a common movable core 35, these parts being so proportioned that, with equal energizations of the coils 33—34, the coils exert substantially equal but opposite effects upon the movable core 35. A dashpot 36 is connected preferably to the core 35 to steady or damp the movements thereof, as well as the movements communicated to the carbon pile 30 through the lever 37. The lever 37 is pivoted at 38 and is connected to the core 35 preferably at a midpoint in the latter. The control of the energization of coils 33—34 will be more fully described hereinafter.

The shaft 14 driven by the engine 10 also drives an alternator 39, preferably in the form of a magneto alternator and preferably, also, single phase. The alternator 39 produces an alternating potential, the frequency of which varies with any changes in speed of rotation of the driven shaft 14, and hence of the engine 10. Another alternator 40, preferably similar to the alternator 39, is driven by an electric motor 41 connected by conductors 42 and 43 across the train line 23—24, the potential across the latter being held constant by the regulator 19—20 and the motor 41, carrying the substantially fixed load represented by the alternator 40, is thus made to operate at substantially constant speed, for a given energization of its field winding 44.

The shunt field winding 44 of the motor 41 has its one terminal connected by conductor 42 to train line conductor 24, and its other terminal is connected through a manually adjustable resistance 45 and through a variable resistance 46 controlled by the handle 13 of the throttle valve 12, and thence to the other train line conductor 23. By means of the resistance 45 the speed of drive of the motor 41, and hence the frequency of the potential of the alternator 40, may be fixed. The frequency to which the alternator 40 is set is preferably equal to that which characterizes the output of the alternator 39 when the shaft 14 and engine 10 are rotating at the desired speed.

At 47 is shown diagrammatically a synchroscope. Alternators 39 and 40 are connected to the synchroscope 47 which, by the way, may be of any suitable or convenient construction for indicating, by means of a movable member or hand 48, whether or not the two alternators 39 and 40 are in synchronism and for indicating which alternator has the higher frequency.

The indicator arm 48 is preferably conductive and acts as a contactor being connected by conductor 49 to the common or midpoint of the two serially connected coils 33—34. To the left of contactor 48 is a contact 50, and to the right is a contact 51. Contact 50 is connected by conductor 52 to the remaining terminal of coil 33, and contact 51 is connected by conductor 53 to the remaining terminal of coil 34.

The serially connected coils 33—34 are bridged across the train line 23—24 by conductors 54—55, a resistance 56 being preferably inserted in one of these conductors.

Assuming the engine 10 to be in operation and operating the parts driven thereby at such a speed that the potential of the alternator 39 is in synchronism with the potential of the alternator 40, the synchroscope 47 will hold the indicator and contactor arm 48 in the position shown in the drawing, and hence intermediate of the fixed contacts 50—51. Coils 33—34 are equally energized from the train line 23—24 and hold the core 35 in a position of equilibrium, thus holding a corresponding pressure upon and hence resistance of the carbon pile 30. Should, however, the engine 10 speed up, as for example, due to a diminishing of the load on the generator A, the frequency of the output of the alternator 39 increases with this increase in speed of the shaft 14; the synchroscope 47 responds at once to this departure in frequency of the alternator 39 from the fixed frequency of the alternator 40 and moves the arm 48 in counter-clockwise direction, and hence into contact with the fixed contact 50, thus short-circuiting coil 33. The resistance of coil 33 having thus been removed from the circuit of coil 34, the energization of the latter is correspondingly increased, and this action, together with the absence of an opposing pull on the part of coil 33, causes the core 35 to be moved downwardly and to increase, through the lever 37, the pressure on carbon pile 30.

The resistance of carbon pile 30 is thus decreased, the excitation of field winding 15 of generator A is correspondingly increased, and similarly, also, the output of the generator A to the load 16—17. This increased load, thus imposed upon the engine 10, causes the latter to slow down until its speed is such as will cause the frequency of alternator 39 to be again equal to the frequency of alternator 40, synchroscope 47 moving the contactor 48 into neutral position. In this neutral position, as shown in the drawing, the coils 33 and 34 are equally energized, as above noted, they exert substantially equally opposing effects, and hold the core 35 in a position of equilibrium, substantially maintaining the above-mentioned increased output of the generator A.

Should the engine 10 and the shaft 14 driven thereby decrease in speed as, for example, when the vehicle reaches an up-grade in its path, and due, therefore, to the increased load imposed upon the engine 10, a reverse action takes place, the frequency of alternator 39 becoming less than the frequency of alternator 40 and synchroscope 47 moving its contactor 48 in clockwise direction to short-circuit coil 34 and thus to increase the energization of coil 33. The core 35 is thus moved upwardly, the pressure on carbon pile 30 reduced, and due to the increased resistance thereof the excitation of the generator A is diminished, its power output correspondingly diminished, and the engine 10, being thus relieved of the additional load which caused it to slow down, speeds up to normal speed again.

Such actions as the above may repeat themselves, depending upon the frequency with which changes in speed take place.

If it is desired to cause the engine 10 to operate at a different speed, all for a given setting of the throttle valve 12, the adjustable resistance 45 is changed or adjusted to a new value, thus changing the excitation of motor 41 and correspondingly changing the speed of rotation thereof, and hence of the alternator 40. The frequency of the output of the latter is correspondingly altered and thus the alternator 40 is made to set a new standard of frequency with respect to which the synchroscope 47 is actuated in response to changes in frequency of the alternator 39.

As above noted, I prefer, also, to cause the throttle valve 12, when operated manually by the handle 13, to bring about a change in the standard of speed control of the engine 10 achieved by the coaction of the alternators 39 and 40, synchroscope 47, and related parts. This arrangement has particular advantage in that I am enabled in a thoroughly practical and dependable manner to match the power output-speed characteristic of the internal combustion engine 10. For example, the characteristic of the engine 10 may be such that at greater outputs thereof (as determined by increasing the opening of the throttle valve 12) the engine 10 should run at higher speed. Accordingly, the actuation of the throttle valve 12 in a direction to increase the fuel supply to the engine 10, and hence in a direction to increase the power output of the engine 10, to progressively increase the ohmic value of the variable resistance 46, thus progressively to increase the speed of the motor 41 and hence to increase the frequency of the alternator 40. Such changes in the setting of the frequency of the alternator 40 are, as will now be clear in view of the foregoing, accompanied by corresponding changes in the speed of the engine 10, and the shaft 14 and apparatus driven thereby.

More particularly, it is of advantage to cause the standard of speed of the engine 10 to be raised or increased at particularly those times when the conditions of the load, such as the beginning of an ascent of an up-grade by the vehicle, require the engine 10 to deliver a greater power output. Thus, movement of the control lever 13 in a direction to increase the fuel supply to the engine 10 is accompanied by an automatic change in the standard of speed, automatically maintained constant by the regulating apparatus, as will cause such an increase in the speed of the engine 10 as will permit the latter promptly and more effectively to "pick up" in response to the increased fuel supply thereto. Thus, the engine is enabled dependably and without danger of stalling, to cope with relatively sudden demands for greater power output.

It will thus be seen that there has been provided in this invention an apparatus and system in which the several objects hereinbefore noted, as well as many thoroughly practical advantages, are successfully achieved. It will be seen that the apparatus is of a thoroughly practical nature, is of dependable and reliable action and, moreover, is characterized by such flexibility of control or adjustment thereof as permits the meeting of the widely varying conditions of hard practical use.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, means supplying alternating current of relatively fixed frequency, and means responsive to the difference in said two frequencies for affecting said control means to change the power supplied to said load.

2. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, means supplying alternating current of relatively fixed frequency, and means responsive to preponderance of the first-mentioned frequency for operating said control means to increase the power supplied to said load and responsive to preponderance of said second frequency for operating said control means to decrease the power supplied to said load.

3. In apparatus of the character described, in combination, a prime mover, a generator driven thereby, means forming an electrical load for receiving energy from said generator, means for controlling the power supplied to said load, means for changing the power output of said prime mover, an alternating current generator, the frequency of which varies with changes in speed of said prime mover, means supplying alternating current of relatively fixed frequency, means responsive to the difference in said two frequencies for affecting said control means to change the power supplied to said load, and means responsive to actuation of said power output-speed means for changing the value of one of said frequencies.

4. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, means supplying alternating current of relatively fixed frequency, means for indicating inequality of said two frequencies, and means controlled by said indicating means for actuating said control means.

5. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, means supplying alternating current of relatively fixed frequency, means responsive to the difference in said two frequencies for affecting said control means to change the power supplied to said load, and means for changing the value of said relatively fixed frequency.

6. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, an alternating current generator, means for driving said last-mentioned generator at a substantially fixed speed, means responsive to the difference in the frequencies of said two alternating current generators for affecting said control means, and means for changing the speed of drive of said second-mentioned alternating current generator.

7. In apparatus of the character described, in combination, a prime mover, a generator driven thereby, means forming an electrical load for receiving energy from said generator, means for controlling the power supplied to said load, an alternating current generator, the frequency of which varies with changes in speed of said prime mover, an alternating current generator, means for driving said last-mentioned generator at a substantially fixed speed, means responsive to the difference in the frequencies of said two alternating current generators for affecting said control means, means for changing the power output of said prime mover, and means responsive to the actuation of said last-mentioned means for changing the speed of drive of said second-mentioned alternating current generator.

8. In apparatus of the character described, in combination, a prime mover, a generator driven thereby, means forming an electrical load for receiving energy from said generator, means for controlling the power supplied to said load, means supplying an alternating potential varying in frequency with changes in speed of said prime mover, and means responsive to departures in frequency of said alternating potential from a given frequency for affecting said control means.

9. In apparatus of the character described, in combination, a prime mover, a generator driven thereby, means forming an electrical load for receiving energy from said generator, means for controlling the power supplied to said load, means deriving energy from said prime mover and producing an alternating potential, the frequency of which varies with changes in the speed of said prime mover, means deriving energy from said prime mover and providing an alternating potential of relatively fixed frequency, and means responsive to differences in said two frequencies for affecting said control means to change the power supplied to said load.

10. In apparatus of the character described, in combination, an internal combustion engine having a power output-speed characteristic such that a change in its power output is accompanied by a change in its speed, a load supplied with energy from said engine, variable power transmission means interposed between said engine and said load, means for controlling said variable power transmission means, means supplying an alternating potential varying in frequency with changes in speed of said engine, means responsive to departures in frequency of said alternating potential from a given frequency for controlling said control means, and means for changing the standard of operation of said last-mentioned responsive means.

11. In apparatus of the character described, in combination, an internal combustion engine having a power output-speed characteristic such that a change in its power output is accompanied by a change in its speed, a load supplied with energy from said engine, variable power transmission means interposed between said engine and said load, means for controlling said variable power transmission means, means supplying an alternating potential varying in frequency with changes in speed of said engine, means responsive to departures in frequency of said alternating potential from a given frequency for controlling said control means, means for changing the power output of said engine, and means operative upon actuation of said last-mentioned means for changing the standard of operation of said responsive means.

12. In apparatus of the character described, in combination, a vehicle carrying an internal combustion engine, a generator driven thereby, a motor for driving said vehicle and supplied with energy from said generator, means supplying an alternating potential varying in frequency with changes in speed of said engine, means for controlling the energy supplied said motor from said generator, and means responsive to departures in frequency of said alternating potential from a given frequency for affecting said control means.

13. In apparatus of the character described, in combination, a shaft, motive means for driving said shaft, means providing an alternating potential varying in frequency with changes in speed of said shaft, means operated by said motive means for providing an alternating potential substantially constant in frequency throughout changes in speed of said shaft, and means responsive to departures in frequency of said first mentioned alternating potential from that of said second-mentioned alternating potential for changing the speed of said motive means.

14. In apparatus of the character described, in combination, a shaft, motive means for driving said shaft, means providing an alternating potential varying in frequency with changes in speed of said shaft, means operated by said motive means for providing an alternating potential of relatively fixed frequency, means for changing the speed of drive of said motive means, and means responsive to the difference in frequency of said two alternating potentials for controlling said speed-changing means.

15. In apparatus of the character described, in combination, motive means, means providing an alternating potential and directly driven by said motive means, a second means for providing an alternating potential and indirectly driven by said motive means, and means responsive to the frequency difference between said alternating potentials for changing the speed of said motive means.

16. In apparatus of the character described, in combination, motive means, means providing an alternating current and directly driven by said motive means, means for providing a second alternating current and indirectly driven by said motive means, and means responsive to departures in frequency of said first alternating current means from that of said second alternating current means for changing the speed of said motive means.

17. In apparatus of the character described, in combination, motive means, means providing an alternating potential and mechanically connected to said motive means, a second means for providing an alternating potential and mechanically and electrically associated with said motive means, and means responsive to a change in frequency between said alternating potentials for changing the speed of said motive means.

18. In apparatus of the character described, in combination, motive means, means operated by said motive means for providing an alternating potential varying in frequency with changes in speed of said motive means, means operated by said motive means for providing an alternating potential of relatively fixed frequency, and means responsive to the difference in frequency of said alternating potentials for changing the speed of said motive means.

In testimony whereof, I have signed my name to this specification this fourteenth day of August, 1929.

FRANK W. GODSEY, Jr.